No. 721,216. PATENTED FEB. 24, 1903.
A. M. MEYERS.
CORN HARVESTER.
APPLICATION FILED AUG. 23, 1902.
NO MODEL. 6 SHEETS—SHEET 3.
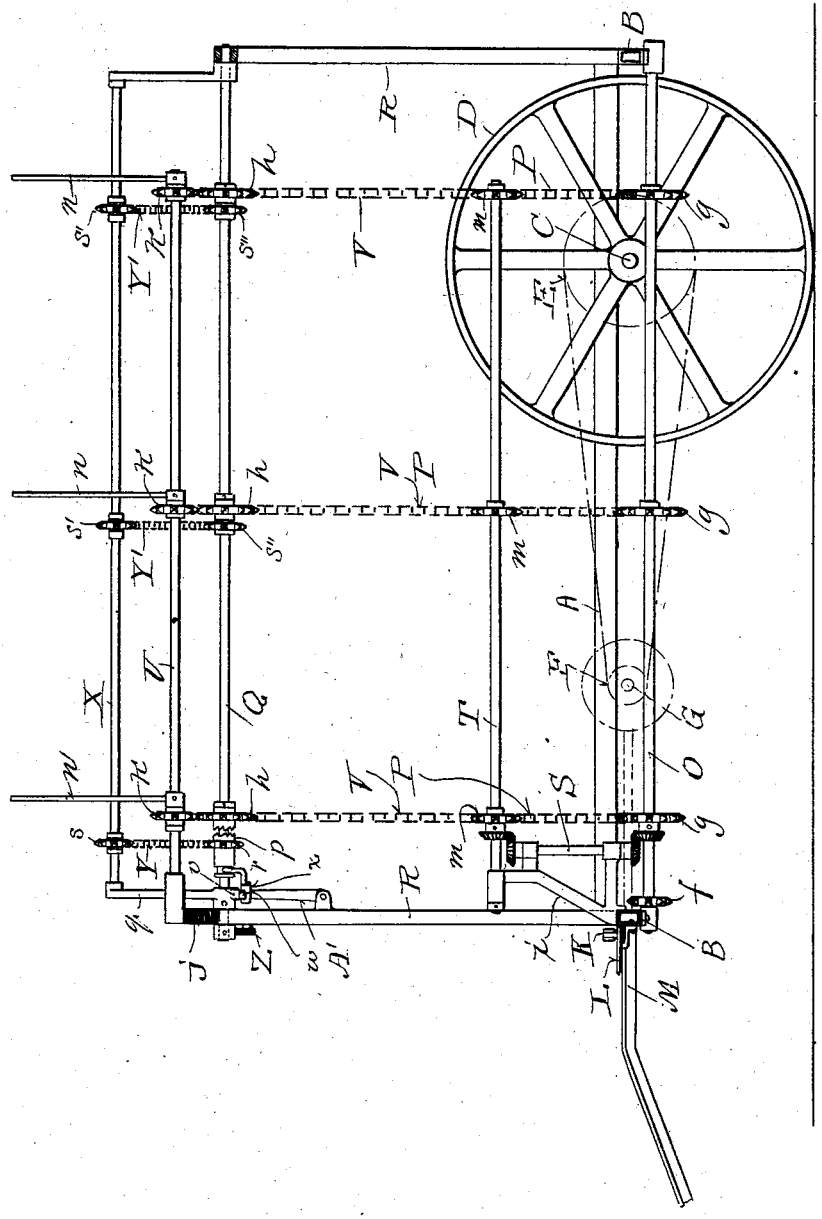

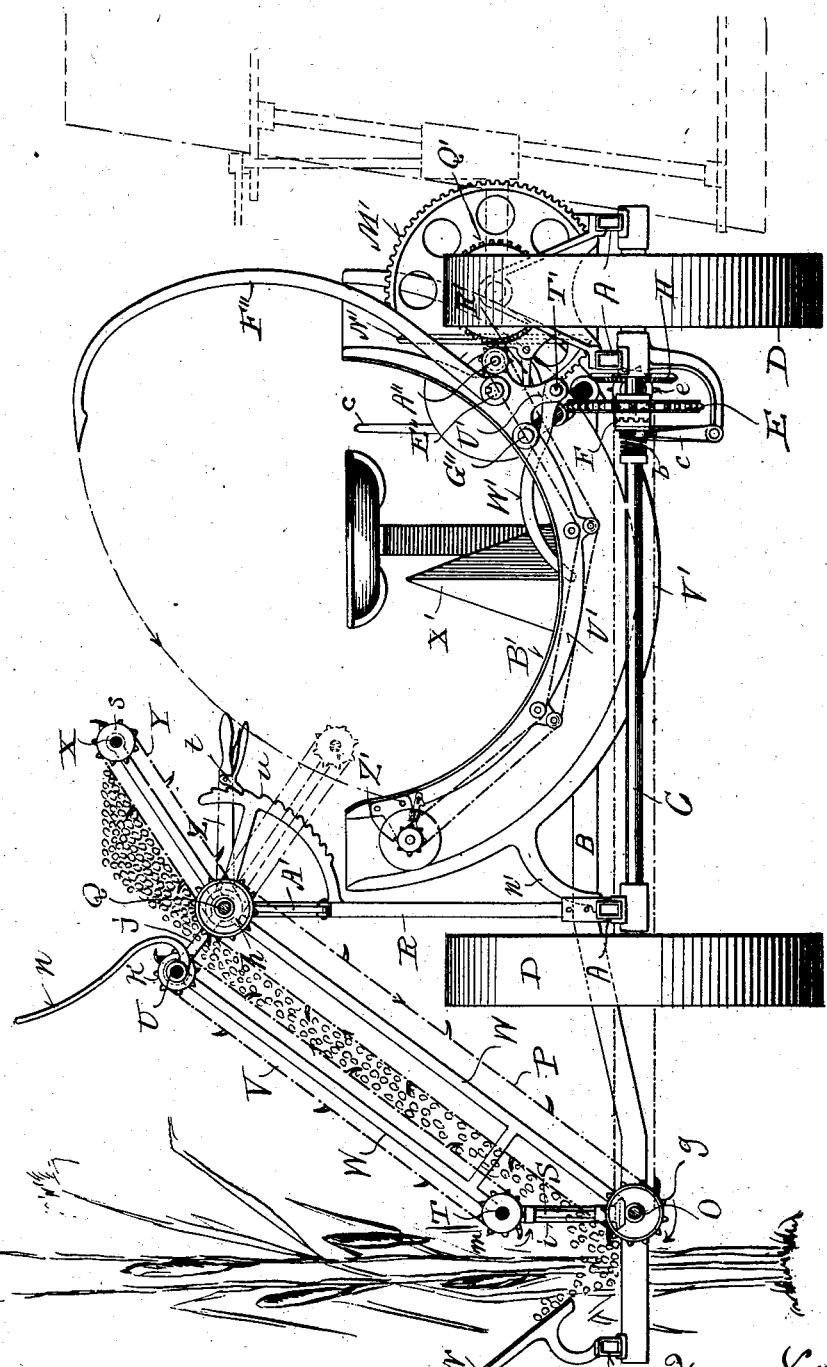

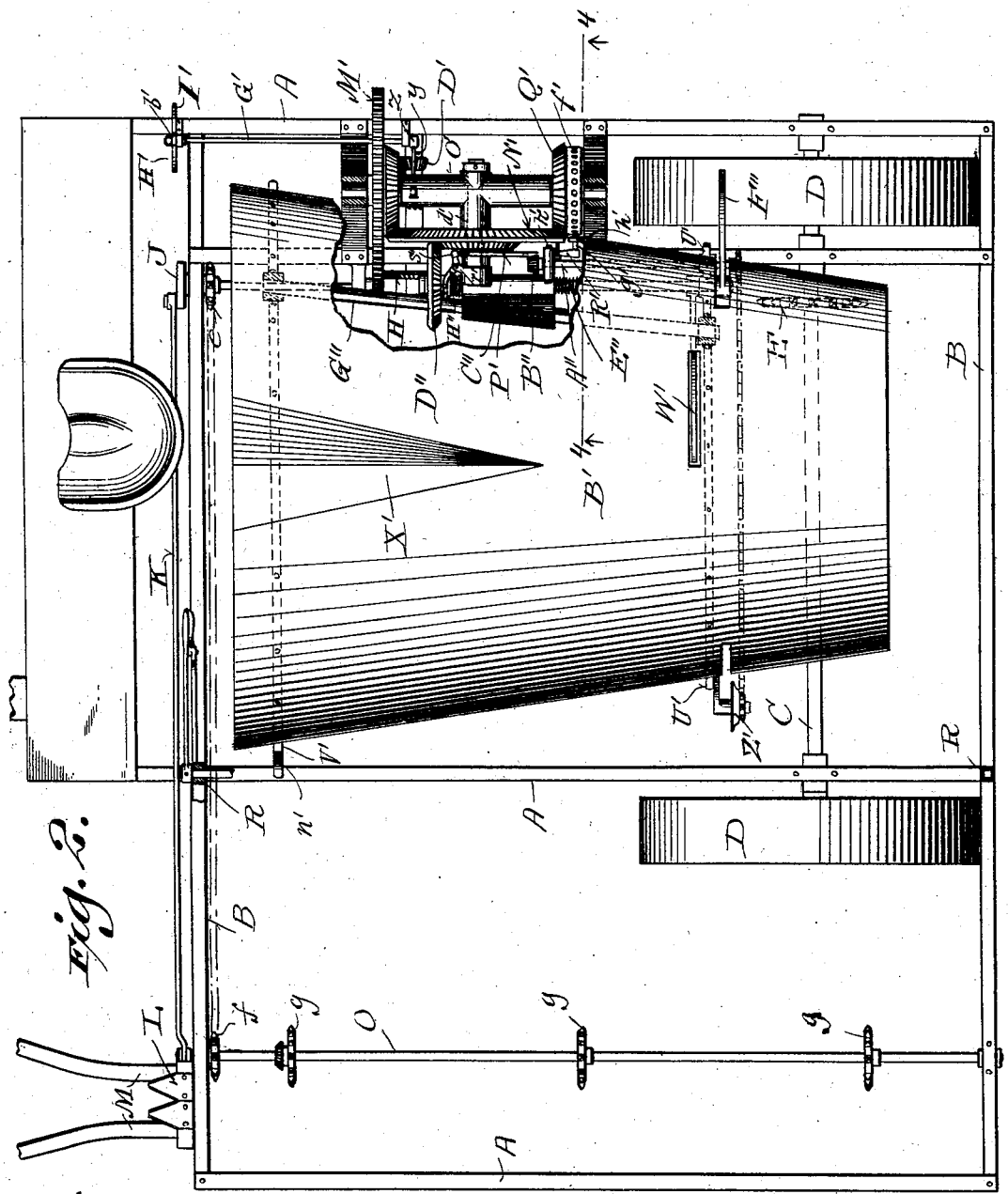

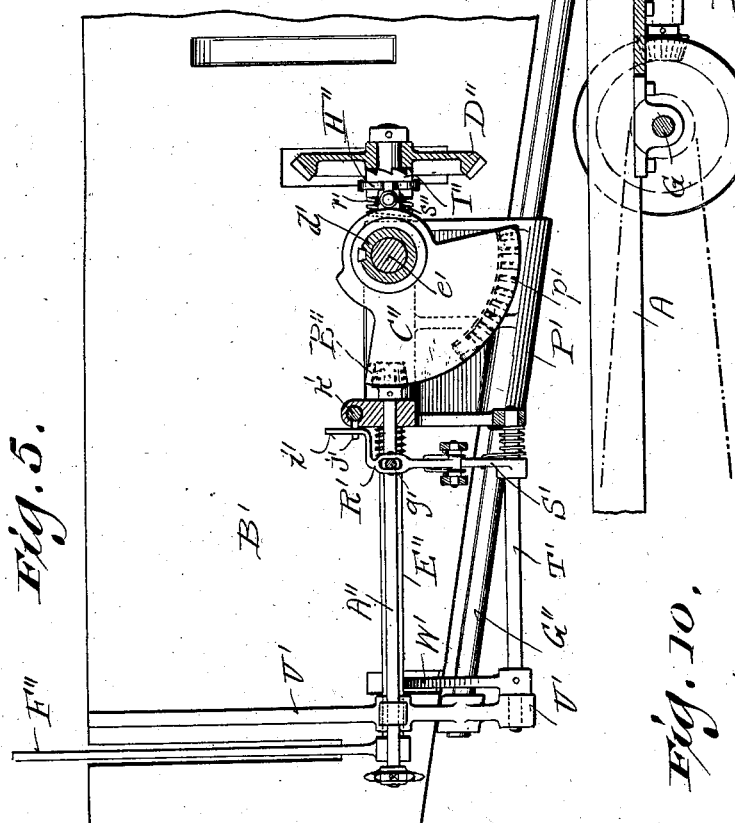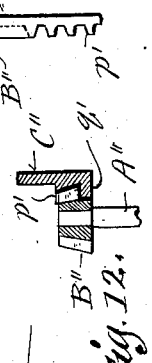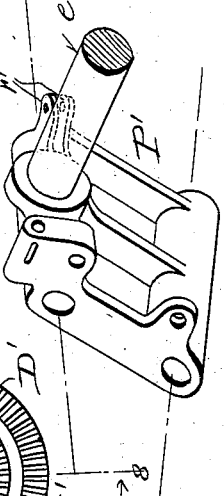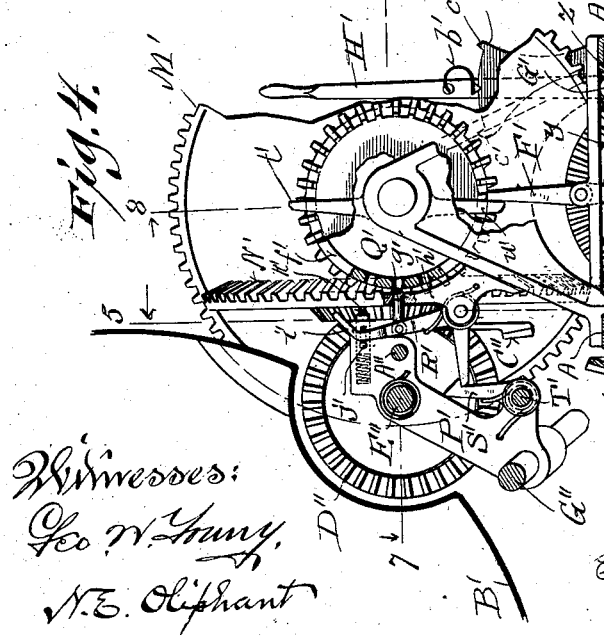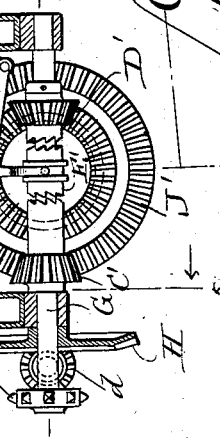

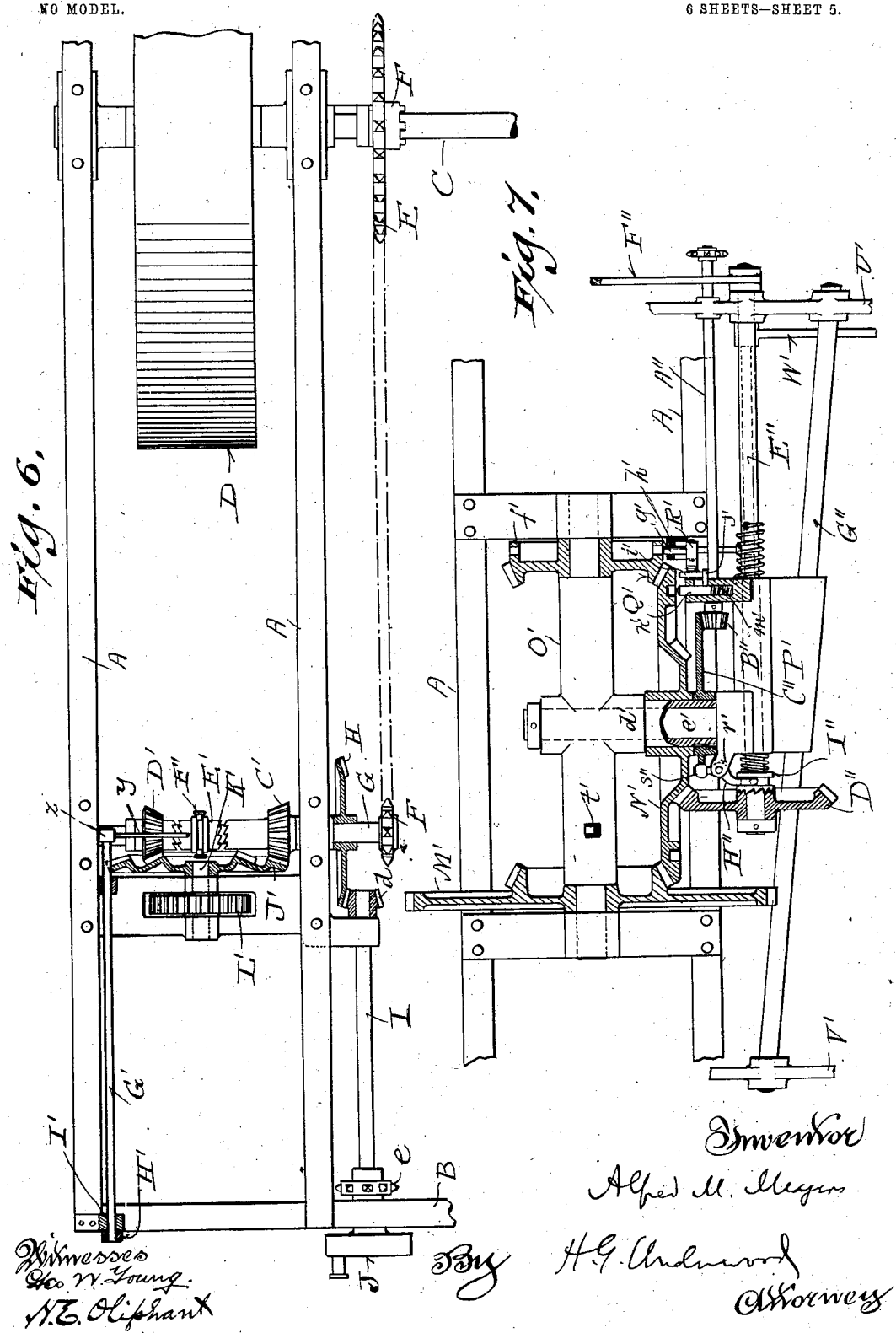

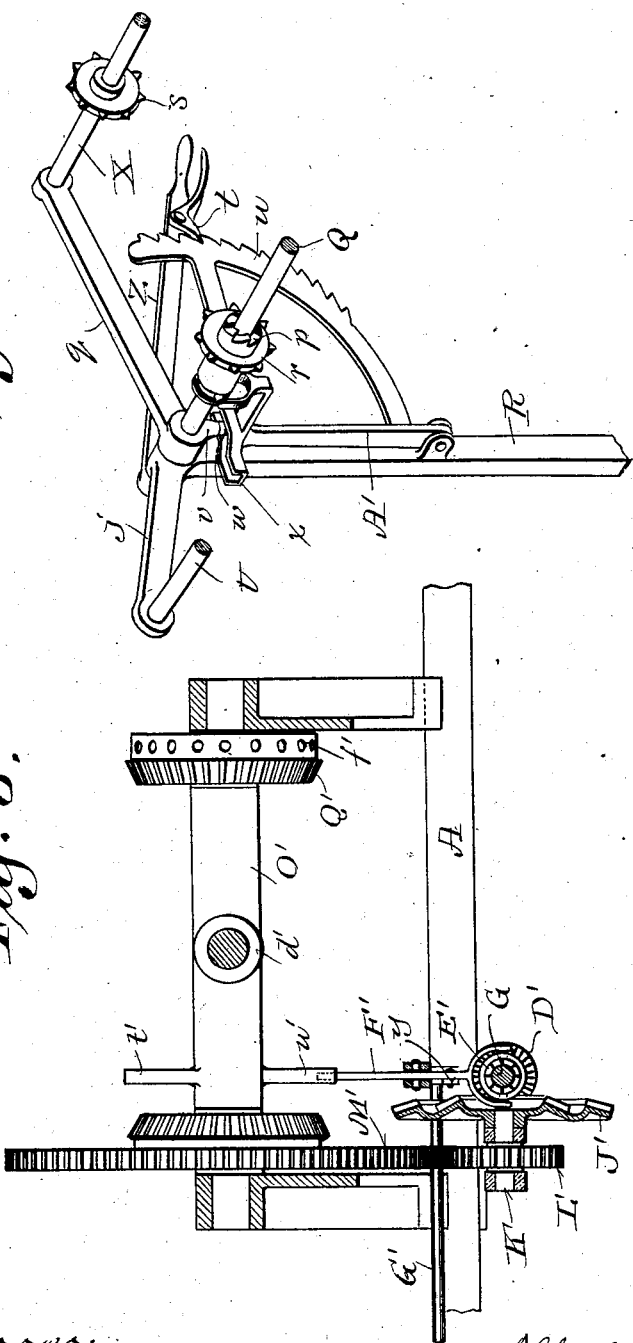

UNITED STATES PATENT OFFICE.

ALFRED M. MEYERS, OF MILWAUKEE, WISCONSIN.

CORN-HARVESTER.

SPECIFICATION forming part of Letters Patent No. 721,216, dated February 24, 1903.

Application filed August 23, 1902. Serial No. 120,798. (No model.)

*To all whom it may concern:*

Be it known that I, ALFRED M. MEYERS, a citizen of the United States, and a resident of Milwaukee, in the county of Milwaukee and State of Wisconsin, have invented certain new and useful Improvements in Corn-Harvesters; and I do hereby declare that the following is a full, clear, and exact description thereof.
My invention has for its object to provide simple, economical, self-binding corn-harvesters organized to automatically dump the shocks therefrom in vertical position, said invention consisting in certain peculiarities of construction and combination of parts hereinafter particularly set forth with reference to the accompanying drawings and subsequently claimed.

Figure 1 of the drawings represents a rear elevation of a corn-harvester in accordance with my invention having parts of the frame thereof omitted; Fig. 2, a plan view of the same having parts thereof broken away; Fig. 3, an elevation of the elevating side of the harvester; Fig. 4, a partly-sectional detail view indicated by line 4 4 in the second figure; Figs. 5, 6, 7, and 8, similar views respectively indicated by lines 5 5, 6 6, 7 7, and 8 8 in the fourth figure; Fig. 9, a perspective view of a fragment of the elevating mechanism; Fig. 10, a similar view illustrating a casting embodied in the machine, and Figs. 11 and 12 detail views illustrating a pinion and rack-tooth segment-plate coöperative in said machine.

Referring by letter to the drawings, A indicates longitudinal and B transverse members of the horizontal (preferably steel) frame of my improved corn-harvester; C, the rear axle, that is also the main shaft of the machine, and D the traction-wheels fast on said axle. In practice the machine has a front axle and wheels; but it has not been deemed necessary to show the same.
Loose on axle C is a sprocket-wheel E, the hub of which is made to be engaged by a clutch F, adjustable on said axle, with which it turns. A spring $b$ is shown arranged to hold the clutch in its engagement with sprocket-wheel E, and a lever $c$, in connection with said clutch, is operated to disengage it from said sprocket-wheel against resistance of the spring. Sprocket-wheel E has link-belt connection, as indicated by dotted lines in Figs. 3 and 6, with another sprocket-wheel F, fast on a shaft G, the bearings for the latter shaft being in connection with longitudinal members of the machine-frame. A bevel gearwheel H, fast on shaft G, meshes with a bevel gear-pinion $d$, fast on another shaft I, arranged in bearings longitudinally of the machine, and in wrist connection with a wheel J, fast on shaft I, is the pitman K of a short sickle-bar L, the cutting-sections of which shear on blades M, that are partly parallel and partly divergent forward of the front of the machine-frame, an upwardly-projecting side shield N being arranged on said frame to deflect cut corn toward link-belt conveyers, hereinafter specified. A sprocket-wheel $e$, fast on shaft I, is for link-belt connection with another such wheel $f$, fast on a parallel shaft O in bearings adjacent to the shield side of the machine, the belt being indicated by dotted lines in Figs. 1 and 2. Fast on shaft O are other sprocket-wheels $g$, engaging link-belt conveyers P, that are also engaged by similar wheels $h$, loose on another shaft Q, supported by standards R, rising from the machine-frame, these conveyers being inclined, owing to the relative positions of said shafts, as is best shown in Fig. 1.

A bracket $i$ of the machine-frame is provided with bearings for a vertical shaft S in bevel-gear connection with shaft O and another shaft T, parallel thereto on a vertical plane, the bracket being also provided with a bearing for the latter shaft. An arm $j$ of the forward one of standards R supports a shaft U, having sprocket-wheels $k$ loose thereon in engagement with link-belt conveyers V, also engaged by other sprocket-wheels $m$, fast on shaft T, these conveyers being parallel to the ones P aforesaid. Shaft U is also provided with outwardly-extending guards $n$, and one end of a guard-frame W is shown in Fig. 1.

The forward sprocket-wheel on shaft Q has its hub made to be engaged with a clutch $p$, adjustable on said shaft to be put in and out of working position with said sprocket-wheel hub. Arms $q$, fast on shaft Q, are provided with bearings for a shaft X, and a sprocketwheel $r$, rigid with clutch $p$, is connected by a link-belt conveyer Y with a similar wheel $s$, fast on shaft X, other sprocket-wheels $s'$, also fast on the latter shaft, being connected by link-belt conveyers Y' with like wheels $s''$ on shaft Q aforesaid. A hand-lever Z, in rigid connection with shaft Q, is provided with a latch-dog $t$, engageable with a quadrant-rack $u$, extending laterally from the forward one of standards R, and a projection of the forward one of the arms $q$ is provided with a depending finger $v$, that carries an antifriction-roller $w$, in engagement with a cam-track head $x$ of a lever A', in pivotal connection with said standard. The cam-head is in spanner connection with clutch $p$, and the hand-lever is operated to vary the angle of the link-belt conveyers Y Y', as shown by full and dotted lines in Fig. 1, said clutch being thrown in or out of working position by the same operation.

From the foregoing it will be understood that corn cut by the machine is elevated between conveyers P V and deposited on conveyers Y Y', to be dumped onto a platform B', hereinafter more particularly described, when the latter conveyers are properly adjusted by means of the lever A' and the clutch $p$ put into working position; but if these latter conveyers are swung up and said clutch thrown out of working position by the same operation elevated corn will accumulate between the then idle conveyers and the shield that in practice is made fast to the supports $n$ in connection with stationary shaft U, above specified.

Loose on shaft G are bevel-pinions C' D', that have their hubs made to be engaged by an intermediate clutch E', adjustable longitudinally of said shaft, with which it turns, this clutch being normally out of working position and controlled by a clutch-lever F', connected by a link $y$ with a crank $z$ of a rod G', supported in bearings on the machine-frame and made fast to a hand-lever H', this lever being provided with a spring-latch $b'$, having taper fit in a center notch of the arc-shaped upper edge of a plate I' in connection with said frame, stop-lugs $c'$ of the plate serving to limit throw of said hand-lever in either direction. The bevel gear-pinions mesh with a double bevel gear-wheel J', fast on a spindle K', mounted in bearings with which the machine-frame is provided, and a spur-pinion L', fast on the same spindle, meshes with a spur-wheel M', having a bevel-gear hub that meshes with the teeth in the circle of greatest diameter of a double bevel gear-wheel N', loose on a shouldered reduction of an arm $d'$ of a cross-casting O', that constitutes a bearing for a shank $e'$ of a casting P', to which the platform B' of the machine is made fast, other arms of the cross-casting at right angles in opposite direction to the one aforesaid being journaled in bearing on the machine-frame, the spur-wheel aforesaid being loose on the front journal of said cross-casting. The teeth in the circle of greatest diameter of bevel gear-wheel N' also mesh with a bevel gear-wheel Q', loose on the rear journal of the cross-casting, and this latter wheel is provided with an annular back flange $f'$, perforated at intervals to be engaged by a bolt $g'$, pivotally hung in an eye of an arm of a spring-controlled bell-crank lever R', for which the machine is provided with a stationary fulcrum and a guide $h'$ for the bolt. An angular offset $i'$ of the eye or bolt arm of the bell-crank lever R' has an inclined extremity in opposition to a lug $j'$ of a bolt $k'$, guided in the casting P', and said lug has play in a slot of said casting. A spring $m'$ is arranged in casting P' to oppose bolt $k'$, and this spring is normally under compression, due to retraction of the bolt by the inclined extremity of angular offset of the bell-crank lever aforesaid, said bolt being for engagement with perforations at intervals of a circle on the double bevel gear-wheel N', above specified. The other arm of bell-crank lever R' is normally caught under a spring-controlled latch S', fast on a shaft T', that has its bearing in casting P' and in an arm U', to which and another arm V' the platform B' is made fast. Rigid with shaft T' is a tripper W', that plays in a slot of the platform, and this platform is a curved, tapered, and inclined shell having its greatest width at the front end when in normal position to receive the cut corn from the elevating mechanism. The forward normally lowest portion of the platform is provided with a tapered central spreader X', and the platform-arm V' is provided with a foot $n'$, that normally rests on a longitudinal member of the machine-frame.

Shown as having its bearing in the platform-arm U' is an Appleby knotter Z', this knotter being driven by link-belt and sprocket-gear connection with a shaft A'', carrying a mutilated bevel-pinion B'', that comes in and out of mesh with a rack $p'$, constituting part of an arc flange $q'$ on the inner side of a partly-segmental casting C'', fast on the shouldered reduction of the arm $d'$ of cross-casting O', the cut-away portion of said pinion being guided on said flange, with which it is normally in contact. The teeth of the circle of smallest diameter of double bevel gear-wheel N' mesh with a bevel gear-wheel D'', loose on a spring-controlled shaft E'', that has its bearings in casting P' and arm U', a compressor F'' being made fast to this shaft to have play in side notches of the platform, these notches being alined forward of the knotter Z', it being understood that in practice the compressor carries twine to the knotter; but it has not been deemed necessary to illustrate twine in connection with said compressor or to show a knotter mechanism in detail.

Fast in casting P' and rigid with the platform-arms U' V' is a bar G'', and trunnioned in ears $r'$ of said casting is a spanner H'', this spanner being in connection with a clutch I'', adjustable on the compressor-shaft E'' and which turns therewith, said clutch being thrown in and out of engagement with clutch-teeth with which the hub of gear-wheel D″ is provided. An antifriction-roller s″ on the shank of spanner H″ opposes the partly cam edge of the casting C″, above specified.

The clutch-lever F′ is fulcrumed on the machine-frame to be in the path of diametrically opposite lugs t′ u′ on an arm of the cross-casting O′, and these lugs are operative against said lever to automatically adjust the clutch E′ aforesaid.

When a sufficient quantity of cut corn has accumulated on the platform, the operator actuates hand-lever Z to elevate the adjustable conveyers clear of the platform B′ and throw the clutch p out of working position. The operator then moves lever H′ to throw clutch E′ into engagement with the bevel gear-pinion C′, whereby the compressor F‴ is actuated. As the shock on the platform is compressed the tripper W′ is operated to release latch S′ from bell-crank R′, this operation resulting in an automatic adjustment of the bolts g′ k′ to engage the gear-wheels Q′ N′, whereby the bevel-gear hub of spur-wheel M′ lifting on the double bevel gear-wheel N′ will cause the latter to ride on bevel gear-wheel Q′, that is now stationary, and said wheel N′ being locked to the casting P′ this casting and the platform therewith rotate on the arm d′ of cross-casting O′, this cross-casting being at the same time movable on its own axis. Hence said platform has a combined motion of approximately one hundred and eighty degrees on the cross-casting axis and ninety degrees on the axis of bevel gear-wheel N′ to be eventually approximately vertical at a side of the machine, as indicated by dotted lines in Fig. 1, forward of the shock. In the meantime the knotter-shaft is actuated by the engagement of its pinion B″ with the rack p′ of the segmental casting C″ to effect tying of the shock, and the platform and shock being about vertical the cam edge of said casting causes an operation of spanner H″ to bring clutch I″ out of engagement with the hub of gear-wheel D″, the result of this operation being that the compressor F‴ automatically releases the shock and likewise clears the same. At the time of the release and dump of the shock in upright position the lug t′ of cross-casting O′ operates lever F′ to shift clutch E′ from bevel-pinion C′ to bevel-pinion D′, the platform and other parts of the mechanism being then aumatically returned to normal position by reverse operation to that above described, the lug u′ of said cross-casting operating to center said lever and clutch. The spreader X′ on the platform causes a fissure to be formed in the bound shock, and thus provision is had for admission of air to ventilate said shock when left standing in the field.

While I have shown and described link-belt conveyers in the elevating mechanism, other well-known types of conveyers may be substituted in practice and various mechanical changes may be made in the machine without departure from the scope of my invention.

Having thus described my invention, what I claim as new, and desire to secure by Letters Patent, is—

1. A corn-harvester comprising a platform for the reception of cut corn, a compressor and knotter in conjunction with the platform, means for operating the compressor and knotter, and other means coöperative with said compressor and knotter to automatically shift said platform from the approximately horizontal position to an approximately vertical position at a side of the machine forward of the shock that is carried therewith, as well as to cause automatic clearance of the aforesaid compressor from the shock and an automatic return of the aforesaid platform and coöperating devices to normal position.

2. A corn-harvester comprising a platform for the reception of cut corn, a compressor and knotter in conjunction with the platform, means for operating the compressor and knotter, and other means coöperative with said compressor and knotter to impart an automatic combined motion to said platform of approximately one hundred and eighty degrees on one axis and ninety degrees on another axis at right angles to the first, as well as to cause a subsequent automatic clearance of the aforesaid compressor from the bound shock and an automatic return of the aforesaid platform and coöperating devices to normal position.

3. A corn-harvester comprising a platform consisting of a curved tapered and inclined shell having its greatest width at the forward end when in normal position longitudinally of the machine, a compressor and knotter in conjunction with the platform, means for operating the compressor and knotter and other means coöperative with said compressor and knotter to automatically shift said platform from its approximately horizontal position to an approximately vertical position at a side of the machine forward of the shock that is carried therewith, as well as to cause automatic clearance of the aforesaid compressor from the shock and an automatic return of the aforesaid platform and coöperating devices to normal position.

4. A corn-harvester comprising a platform consisting of a curved, tapered and inclined shell having its greatest width at the forward end when in normal position longitudinally of the machine and provided at this end with a tapered central spreader, a compressor and knotter in conjunction with the platform, means for operating the compressor and knotter, and other means coöperative with said compressor and knotter to automatically shift said platform from its approximately horizontal position to an approximately vertical position at a side of the machine forward of the shock that is carried therewith, as well as to cause automatic clearance of the aforesaid compressor from the shock and an automatic return of the aforesaid platform and coöperating devices to normal position.

5. A corn-harvester comprising a cross-casting journaled in stationary bearings and having an arm thereof provided with diametrically opposite lugs, another casting having a pivot-shank loose in a central arm of the cross-casting at a right angle to the axis of same, a platform in rigid connection with the pivot-shank casting, a spur-wheel having a bevel-gear hub loose on one cross-casting journal, a bevel gear-wheel likewise on the other cross-casting journal and provided with an annular flange having bolt-holes at intervals of its circumference, a double bevel gear-wheel that being loose on the central arm of the cross-casting has its teeth in the circle of greatest diameter meshed with the bevel-gear hub and wheel aforesaid, this double gear-wheel being also provided with bolt-holes at intervals of a circle, a bolt in connection with a lever for engagement with the gear-wheel flange aforesaid, a spring-controlled bolt carried by the platform-casting for engagement with the double bevel gear-wheel, a spring-controlled bell-crank lever operative in conjunction with the bolts, a spring-controlled shaft that has its bearings in the pivot-shank casting, a latch on said shaft in position to have spring-controlled engagement with the bell-crank lever, a tripper fast on the same shaft and extended through the platform, a compressor under spring control and fast on another shaft having its bearing in the pivot-shank casting, a bevel gear-wheel loose on the compressor-shaft in mesh with teeth in the circle of least diameter on the aforesaid double bevel gear-wheel, a spring-controlled clutch arranged to turn with the compressor-shaft and be engageable with the hub of the bevel gear-wheel thereon, a clutch-spanner in pivotal connection with the pivot-shank casting, a segmental rack-plate fast on said central arm of the cross-casting and having a cam edge opposing a shank of said spanner, a knotter in connection with the platform and geared to still another shaft having its bearing in the pivot-shank casting, a pinion fast on the latter shaft to come in and out of mesh with the rack-teeth of said plate, a spur-pinion in mesh with said spur-wheel and fast on a spindle having bearings on the machine-frame, a double bevel gear-wheel fast on the same spindle, bevel-pinions loose on a shaft in gear connection with the main shaft of the machine, a clutch arranged on the former of these two shafts to turn therewith intermediate of said pinions with which it is engageable, a lever in connection with the latter clutch arranged to be in the path of the diametrically opposite lugs on the cross-casting, and a hand-lever rigid with a crank-rod in link connection with said clutch-lever.

6. A corn-harvester comprising a dumping-platform, a cutting mechanism, an elevating mechanism, conveying mechanism pivotally adjustable to vary its angle to the elevating mechanism, and means whereby said conveying mechanism is automatically put in motion when depressed over the platform and stopped when elevated to clear said platform.

7. A corn-harvester comprising an elevating mechanism embodying a shaft arranged in bearings, a hand-lever and arms rigid on the shaft, another shaft having its bearings in said arms, a fixed quadrant-rack, a rack-engaging dog in connection with the lever, a pivotal cam-head lever, a projection rigid with the lever-controlled shaft and engaging the cam-head of the pivotal lever, endless conveyers in connection with both shafts, a clutch loose on the aforesaid lever-controlled shaft engageable with the hub of a driven sprocket-wheel on the same shaft, and another sprocket-wheel rigid with the clutch in engagement with a link belt that also engages a similar wheel fast on the arm-supported shaft.

8. A corn-harvester comprising a dumping-platform, an elevating mechanism consisting of inclined corn-lifting conveyers arranged parallel one above another, means for driving said conveyers, an upper corn receiving and dumping mechanism pivotally adjustable to vary its angle with respect to the lifting-conveyers and means whereby said receiving and dumping mechanism is automatically put in motion when depressed over the platform and stopped when elevated to clear the same.

In testimony that I claim the foregoing I have hereunto set my hand, at Milwaukee, in the county of Milwaukee and State of Wisconsin, in the presence of two witnesses.

ALFRED M. MEYERS.

Witnesses:
N. E. OLIPHANT,
B. C. ROLOFF.